United States Patent [19]

Kirkland

[11] Patent Number: 4,765,755
[45] Date of Patent: Aug. 23, 1988

[54] ROLLER MILL

[75] Inventor: Billie R. Kirkland, Langley, S.C.

[73] Assignee: J. M. Huber Corporation, Locust, N.J.

[21] Appl. No.: 721,250

[22] Filed: Apr. 8, 1985

[51] Int. Cl.⁴ ............................................. F16C 21/00
[52] U.S. Cl. .................................... 384/126; 384/130; 384/151
[58] Field of Search ............... 384/126, 607, 151, 150, 384/130, 373

[56] References Cited

U.S. PATENT DOCUMENTS 4,162,110  7/1979  Gardella ............................ 384/607
4,466,751  8/1984  Higuchi ............................. 384/126

Primary Examiner—Lenard A. Footland
Attorney, Agent, or Firm—Harold H. Flanders; August E. Roehrig, Jr.; Alec H. Horn

[57] ABSTRACT

An improved roller-type grinding mill wherein antifriction thrust-type roller bearings and an improved packing are utilized to improve the loading stress absorption characteristics and to prevent dust from entering into the mill structure and thereby shortening the useful life thereof.

5 Claims, 1 Drawing Sheet

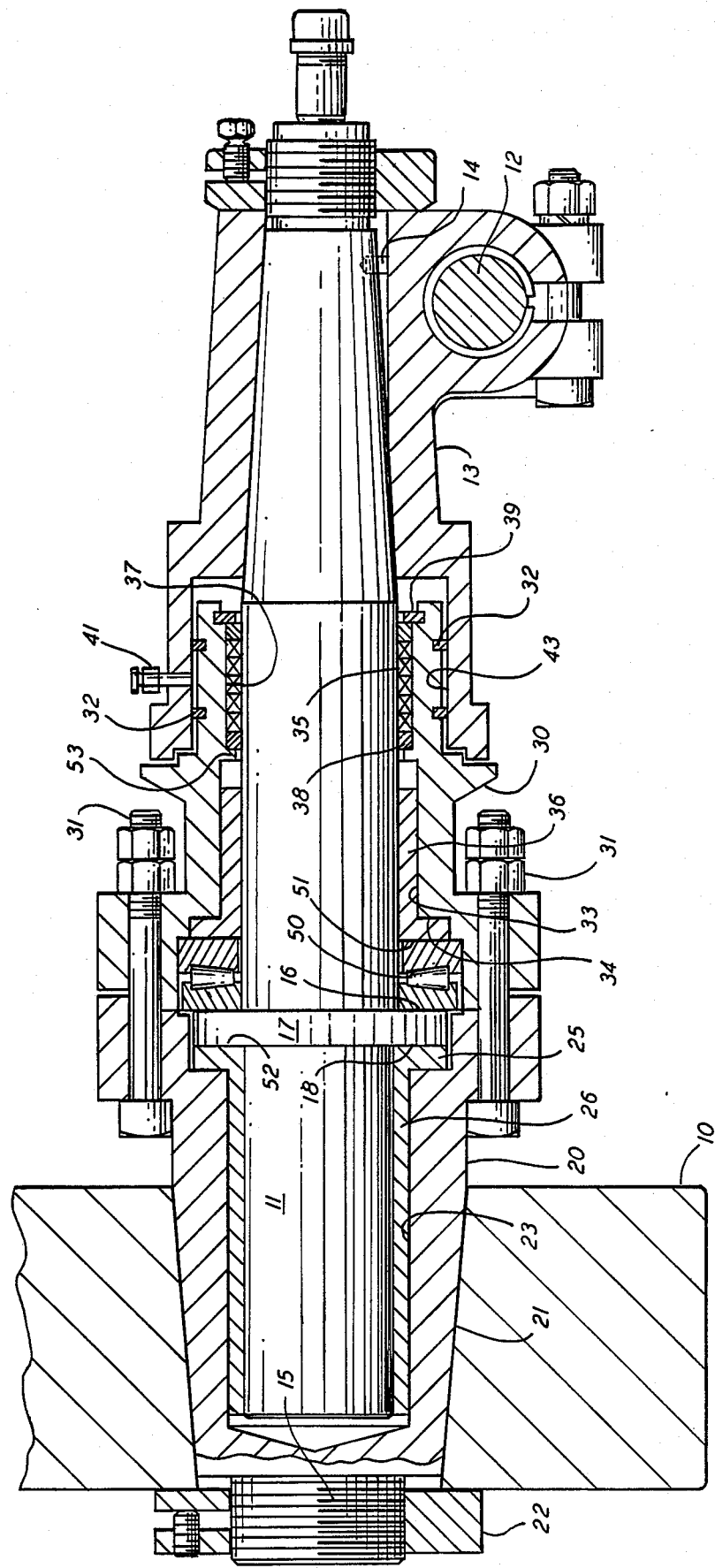

ROLLER MILL

BACKGROUND OF THE INVENTION

This invention relates in general to improvements in roller mill construction. More specifically, but without restriction to the particular use or application which is shown and described for convenience of illustration, this invention relates to a roller mill having an improved bearing and dust seal construction for improving the operational life of the roller grinding mill by increasing bearing life and decreasing damage to the grinding mill structure occasioned by bearing failure.

As is known to those skilled in the art, roller type grinding mills have many applications wherein materials are milled by a plurality of rollers crushing and milling the material until a particular particle size is obtained. Generally, in such operations a plurality of milling rollers are each rotatably supported by separate shafts about which each roller rotates as they travel in a circular path during the milling operation. In such operations, the environment in which this mechanism operates becomes extremely dusty, frequently resulting in dust particles or particles of the material being milled entering within the roller mill structure where these materials accumulate causing bearing failure within a short time period. The accumulation of such foreign materials in combination with the loading forces imposed on the roller mill during operation prematurely shortens the useful like of such equipment by destroying the friction type bearing heretofore used in such equipment which, upon failure, frequently damages other machine elements.

SUMMARY OF THE INVENTION

It is, therefore, an object of this invention to improve roller-type grinding mills.

Another object of this invention is to lengthen the useful life of roller-type grinding mills by improving the bearing structure utilized therein.

A further object of this invention is to improve the useful life of roller-type grinding mills by improving the dust sealing structure utilized to prevent small foreign material generated during the milling operation from entering within the apparatus thereby shortening its useful life.

These and other objects are attained in accordance with the present invention wherein there is provided an improved roller-type grinding mill wherein antifriction thrust-type roller bearings and an improved packing are utilized to improve the loading stress absorption characteristics and to prevent dust from entering into the mill structure and thereby shortening the useful life thereof.

DESCRIPTION OF THE DRAWINGS

Further objects of the invention, together with additional features contributing thereto and advantages accruing therefrom, will be apparent from the following description of a preferred embodiment of the invention which is shown in the accompanying drawing wherein there is illustrated a partial cross-sectional view of a portion of a roller-type grinding mill to show the improved bearing and sealing structure incorporated therein.

DESCRIPTION OF A PREFERRED EMBODIMENT

Referring now to the drawing, there is illustrated a cross-sectional view of a portion of a roller-type grinding mill wherein a roll 10 is utilized to apply a crushing or milling force to materials. The roll 10 is carried upon a stationary journal shaft 11, and is vertically movable and supported in operation by means of a trunnion shaft 12 which is operatively connected to a journal head 13, to which a portion of the journal shaft 11 is secured, by a dowel pin 14. In this manner, the roll 10 and supporting journal shaft 11 are carried for pivotal movement in a vertical direction about the trunnion shaft 12 as the roll 10 rotates during the milling operation.

As is known to those skilled in the art, generally a plurality of units such as shown in the drawing are used in a milling operation. These units are each supported by a trunnion shaft and the rolls rotate while the journal shaft travels in a circle with the rollers of each unit rolling upon what is referred to as a bullring. The material to be milled is placed on the bullring and, as the rollers circle about the bullring, the material is crushed. Since each of the units is the same, for convenience of illustration, only one such unit need be described.

The roll 10 is secured on a tapered portion 21 of a lower bushing housing 20 by means of the complementary tapers between the inner diameter of the roll 10 and the other diameter of the lower journal housing. A roll lock nut 22 is used to secure the roll 10 in such position by threadingly engaging a threaded end 15 of the journal shaft 11. The lower journal housing 20, to which the roll 10 is secured, is joined at its other end to one end of an upper journal housing 30 by means of suitable machine bolts 31. An internal bore 23 is formed within the lower journal housing 20 and includes a shoulder portion 24 against which a flange portion 25 of a lower bushing 26 is positioned. The lower bushing 26 is positioned concentrically within the internal bore 23 and functions to provide a surface for permitting the roll 10 and lower bushing journal 20 to rotate about the stationary journal shaft 11.

The end of the upper journal housing 30 which is joined to the lower bushing housing 20 is also formed with an internal bore 33. The internal bore 33 receives an upper bushing 36, which is positioned concentrically within the bore 33 and positioned against a first shoulder portion 34 formed therein for performing the same function as the lower bushing 26.

The opposite end of the upper journal housing 30 is positioned within an internal bore 43 forming an open end for the journal head 13, and sealed therewith. A pair of piston rings 32 are carried by the upper journal housing 30 to provide a seal between the inner bore 43 of the journal head 13 and the portion of the upper journal housing 30 positioned therewithin. A packing 35 is carried within a second inner bore 37 of the upper journal housing 30 and positioned against the outer diameter of the journal shaft 11. The packing 35 is held in this position between a bronze sealing ring 38 and a lock ring 39 to seal the rotational movement of the upper journal housing 30 within the open end of the journal head 13 and about the outer diameter of the stationary journal shaft 11. The bronze ring 38 is positioned against an internal shoulder 53 which separates the two internal bores 33 and 37 formed in the upper journal housing. A grease fitting and passage 41 is provided in the adjacent portion of the open end of the journal head 13 to introduce lubricant into this sealing area.

In order to further improve the operational life of the roller grinding mill, an antifriction thrust-type roller bearing 50 is utilized between a face portion 51 of the upper bushing 36, and one face 16 of a shoulder portion 17 of the stationary journal shaft 11. The other face 18 of the shoulder portion 17 abuts a face portion 52 of lower bushing 26. This antifriction type thrust bearing, for example, a SFK29322 manufactured by SFK Industries, Inc., Philadelphia, Pa., is positioned between the opposed faces 51 and 52 of the two bushings and the faces 16 and 18 of the shoulder portion 17 formed on the stationary journal shaft 11 so that the entire assembly, the upper and lower bushings carried within their respective journal housings 20 and 30, and the roller 10 mounted on the lower tapered portion of the lower journal housing 20, are free to rotate about the stationary journal shaft 11 with the trust bearing 50 providing a support for the assembly upon the journal shaft 11. The piston ring/packing system previously described provides a seal between the rotating portions of the assembly and the stationary portions thereby preventing dust, dirt or small particulate materials from entering into the mechanism and destroying the bearing assembly.

While the invention has been described in the specification and illustrated in the drawing with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment illustrated by the drawing and described in the specification as the best manner presently known for carrying out this invention, but that the invention will include any embodiments falling within the scope of the appended claims.

I claim:

1. In a roller mill wherein a milling roll is supported on a journal housing for rotational movement about a stationary journal shaft with a portion of the journal housing extending within a journal head which is pivotally attached to a trunnion shaft for providing pivotal movements to these components during a milling operation, the improvement comprising: antifriction thrust-type roller bearing means for supporting said journal-housing-supported milling roll upon said stationary journal shaft for rotational movement thereabout, said journal housing being formed in two parts comprising a lower journal housing and an upper journal housing, and each of said lower journal housing and said upper journal housing being formed with an internal bore within which is positioned a bushing for engaging said stationary journal shaft, said antifriction thrust-type roller bearing means being positioned about said stationary journal shaft and operatively connected with an internal portion of said journal housing, said bearing means being positioned to engage one of said bushings and a shoulder portion formed on said stationary journal shaft, and sealing means carried between said journal housing and said stationary journal shaft for preventing particulate material from contacting said antifriction thrust-type roller bearing means.

2. In a roller mill wherein a milling roll is supported on a journal housing for rotational movement about a stationary journal shaft with a portion of the journal housing extending within a journal head which is pivotally attached in a trunnion shaft for providing pivotal movements to these components during a milling operation, the improvement comprising: antifriction thrust-type roller bearing means for supporting said journal-housing-supported milling roll upon said stationary journal shaft for rotational movement thereabout, said antifriction thrust-type roller bearing means being positioned about said stationary journal shaft and operatively connected with an internal portion of said journal housing, and sealing means carried between said journal housing and said stationary journal shaft for preventing particulate material from contacting said antifriction thrust-type roller bearing means, said sealing means including a pair of piston rings carried on a portion of said journal housing which is positioned within said journal head, and said piston rings forming a seal between said portion of said journal housing which is positioned within said journal head and an internal portion of said journal head into which said journal housing is positioned.

3. The apparatus of claim 2, wherein said sealing means further includes a packing positioned between an internal bore formed in said journal housing and the outer diameter of said stationary journal shaft, and ring means positioned adjacent the ends of said packing to maintain said packing in a desired position.

4. The apparatus of claim 3, further including stop means formed as a portion of the internal bore in said journal housing for abutting said ring means to ensure proper positioning of said sealing packing.

5. The apparatus of claim 4, further including means for introducing a lubricating fluid into the space between said portion of said journal housing positioned within said journal head and said journal head.

* * * * *